(12) United States Patent
Zeng et al.

(10) Patent No.: US 9,342,237 B2
(45) Date of Patent: May 17, 2016

(54) AUTOMATED TESTING OF GESTURE-BASED APPLICATIONS

(71) Applicant: SAP AG, Walldorf (DE)

(72) Inventors: Xian Zeng, Shanghai (CN); Chuan Wang, Shanghai (CN); Yu Hao, Shanghai (CN); Xiaoqian Geng, Shanghai (CN)

(73) Assignee: SAP SE, Walldorf (DE)

( * ) Notice: Subject to any disclaimer, the term of this patent is extended or adjusted under 35 U.S.C. 154(b) by 159 days.

(21) Appl. No.: 13/688,243

(22) Filed: Nov. 29, 2012

(65) Prior Publication Data

US 2014/0132571 A1 May 15, 2014

(30) Foreign Application Priority Data

Nov. 12, 2012 (CN) .......................... 2012 1 0449497

(51) Int. Cl.
| | | |
|---|---|---|
| *G06F 3/0488* | (2013.01) | |
| *G06F 17/30* | (2006.01) | |
| *G06F 9/44* | (2006.01) | |
| *G06F 11/36* | (2006.01) | |

(52) U.S. Cl.
CPC .......... *G06F 3/04883* (2013.01); *G06F 9/4443* (2013.01); *G06F 11/3688* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 9,154,611 | B1 * | 10/2015 | Jackson | H04L 41/0253 |
| 2011/0191676 | A1 * | 8/2011 | Guttman et al. | 715/716 |
| 2011/0310041 | A1 * | 12/2011 | Williams et al. | 345/173 |
| 2012/0054715 | A1 * | 3/2012 | Welchman et al. | 717/106 |
| 2013/0127877 | A1 * | 5/2013 | Blas et al. | 345/474 |
| 2013/0273853 | A1 * | 10/2013 | Reed et al. | 455/67.11 |
| 2013/0290786 | A1 * | 10/2013 | Artzi et al. | 714/32 |
| 2014/0045483 | A1 * | 2/2014 | Whidden | 455/420 |
| 2014/0089904 | A1 * | 3/2014 | Wray | 717/135 |

OTHER PUBLICATIONS

Shahedul Huq Khandkar et al., Tool Support for Testing Complex Multi-Touch Gestures, ITS 2010: Meta Gestures, Nov. 7-10, 2010, pp. 59-68, Germany.
Shaun K. Kane et al., Usable Gestures for Blind People: Understanding Preference and Performance, CHI 2011 Session: Gestures, May 7-12, 2011, pp. 413-422, Canada.

* cited by examiner

*Primary Examiner* — Gerald Johnson
*Assistant Examiner* — Maheen Javed
(74) *Attorney, Agent, or Firm* — Horizon IP Pte. Ltd.

(57) ABSTRACT

A technology for facilitating testing of a web application is provided. In some embodiments, a data file including recorded data of one or more recorded gesture-events is received. A test case is loaded with the recorded data. The one or more recorded gesture events are replayed in the test case and the web application is executed to generate test results.

18 Claims, 9 Drawing Sheets

AUTOMATED TESTING OF GESTURE-BASED APPLICATIONS

TECHNICAL FIELD

The present disclosure relates generally to software testing.

BACKGROUND

With the rapid development of mobile computing devices (e.g., smartphones, tablet computers, e-readers, music players, etc.), software programs running on these platforms have become very popular. Different from desktop software programs that interface with users using the traditional keyboard and mouse, these mobile software programs typically include support for tactile user interfaces that are controlled by touch, multi-touch (e.g., tap, pinch, etc.), and other gesture events.

The testing of such mobile programs poses some real challenges. Native programs that are installed locally in the mobile device are easier to test, because a primal simulator is typically included in the software development kit (SDK). Web applications that load via a web browser, however, are more difficult to test automatically, without native support and common application programming interfaces (APIs) for multi-touch gestures. The tools that support testing multi-touch events in web applications are limited, and software testers often have to test such applications manually. Manual testing can be a very tedious, error-prone and costly process. The tests are typically very difficult to reproduce and maintain, and can be extremely time consuming.

Thus, a need exists for systems, methods, and apparatuses to address the shortfalls of current technology, and to provide other new and innovative features.

SUMMARY

A computer-implemented technology for facilitating testing of a web application is described herein. In some implementations, a data file including recorded data of one or more recorded gesture events is received. A test case is loaded with the recorded data. The one or more recorded gesture events are replayed in the test case and the web application is executed to generate test results.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Systems, methods, and apparatuses for facilitating testing of gesture-based software in a test automation framework are described herein. The test automation framework may be provided to perform testing of gesture-based web applications that would otherwise need to be performed manually. Web applications, as used herein, refer to software programs that are coded in a browser-supported language (e.g., JAVASCRIPT, Hypertext Markup Language (HTML), Extensible Markup Language (XML), the Extensible Hypertext Markup Language (XHTML), Cascading Style Sheet (CSS), and JAVA, etc.) and rely on a common web browser (e.g., MICROSOFT WINDOWS INTERNET EXPLORER, MOZILLA FIREFOX, APPLE SAFARI, GOOGLE CHROME, OPERA, etc.) or other client application over a network, to render them executable.

Gesture-based web applications support the use of gestures, such as touch, multi-touch, or physical movement, as input during a user interaction. Conventional technology simulates gesture events either programmatically (e.g., using a test script), or using traditional input triggers (e.g., mouse or keyboard). However, it is difficult and tedious to simulate all the different types of gesture inputs. Unlike conventional technology, the present technology simulates gesture events by using real recorded data, and therefore is not limited to the types of gestures that can be simulated programmatically or by traditional input triggers. It can support any type of gesture input that is accepted by the web application being tested, such as a multi-touch gesture that requires the use of more than one finger or other pointing means (e.g., pinch open/close, two finger tap, touch and swipe, etc.).

Implementations described herein automatically record, as test scenarios, gesture-based user interactions with a web application accessed via, for example, a mobile device. The recorded data may be formatted and stored for subsequent retrieval. During automated software testing, the recorded data is used to trigger gesture events on the mobile device, desktop or any other test device that support World Wide Web Consortium (W3C) standard touch events. These, and other exemplary features, will be discussed in more details in the following sections.

Figure 1:
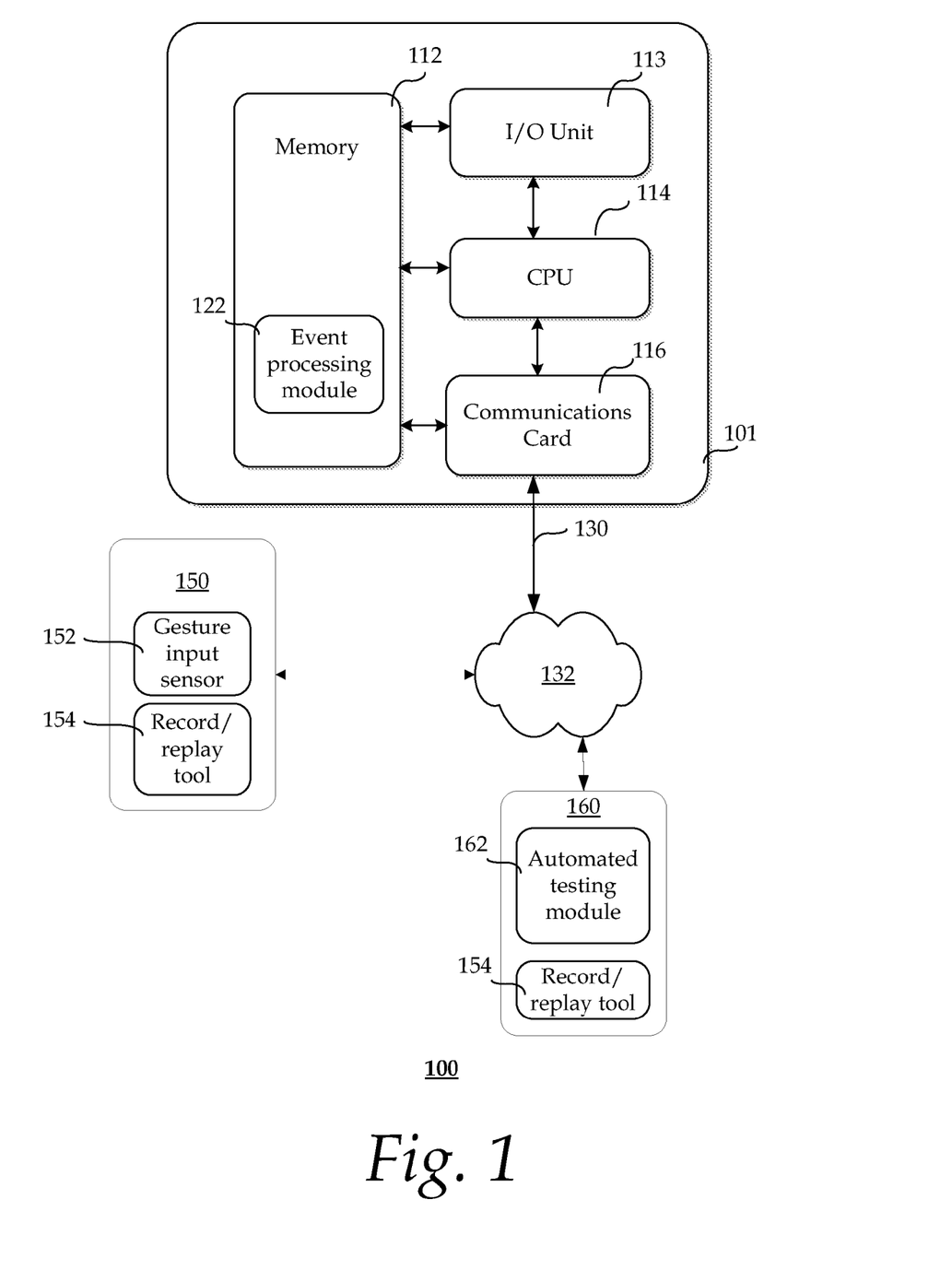
FIG. 1 is a block diagram illustrating an exemplary system.

FIG. 1 is a block diagram illustrating an exemplary system 100 that implements the framework described herein. The system 100 generally includes a server 101, a client device 150, a test computer 160, at least some of which are communicatively coupled through a network 132. In some instances, the server 101 and test computer 160 are co-located or implemented on the same physical machine. Although shown as a single machine, the server 101 may include more than one server, such as a server pool. Two or more client devices 150 may also operate in the system 100.

Turning to the server 101 in more detail, it may include, a non-transitory computer-readable media or memory 112, a central processing unit (CPU) 114, an input-output unit 113, and a communication card 116. Non-transitory computer-readable media 112 may store machine-executable instructions, data, and various programs, such as an operating system (not shown), web services, an event processing module 122 for implementing the techniques described herein, all of which may be processed by CPU 114. As such, the server 101 is a general-purpose computer system that becomes a specific purpose computer system when executing the machine-executable instructions. Alternatively, the event processing module described herein may be implemented as part of a software product or application, which is executed via the operating system. The application may be integrated into an existing software application, such as an add-on or plug-in to an existing application, or as a separate application. The existing software application may be a suite of software applications. It should be noted that the event processing module 122 may be hosted in whole or in part by different computer systems in some implementations. Thus, the techniques described herein may occur locally on the server 101, or may occur in other computer systems and be reported to server 101.

Each computer program may be implemented in a high-level procedural or object-oriented programming language, or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

Non-transitory computer-readable media 112 may be any form of memory device, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks, magneto-optical disks, and Compact Disc Read-Only Memory (CD-ROM).

Server 101 may be communicatively coupled to an input device (e.g., keyboard, touch screen or mouse) and a display device (e.g., monitor or screen) via the I/O unit 113. In addition, Server 101 may also include other devices such as a communications card or device (e.g., a modem and/or a network adapter) for exchanging data with a network using a communications link (e.g., a telephone line, a wireless network link, a wired network link, or a cable network), and other support circuits (e.g., a cache, power supply, clock circuits, communications bus, etc.). In addition, any of the foregoing may be supplemented by, or incorporated in, application-specific integrated circuits.

Server 101 may operate in a networked environment using logical connections to one or more client devices 150 and test computers 160 over one or more intermediate networks 132. These networks 132 generally represent any protocols, adapters, components, and other general infrastructure associated with wired and/or wireless communications networks. Such networks 132 may be global, regional, local, and/or personal in scope and nature, as appropriate in different implementations. The network 132 may be all or a portion of an enterprise or secured network, while in another instance, at least a portion of the network 132 may represent a connection to the Internet. In some instances, a portion of the network may be a virtual private network (VPN). The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the World Wide Web (Internet), and/or any other communication system or systems at one or more locations.

In general, the client device 150 may be any computing device operable to connect to or communicate with at least the server 101, the test computer 160, and/or the network 132 using a wired or wireless connection. In some implementations, the client device 150 may be a mobile device that can be used by an end-user to communicate information using radio technology. The mobile device 150 may be a cellular phone, personal data assistant (PDA), smartphone, laptop, tablet personal computer (PC), e-reader, media player, a digital camera, a video camera, Session Initiation Protocol (SIP) phone, touch screen terminal, enhanced general packet radio service (EGPRS) mobile phone, navigation device, an email device, a game console, any other suitable wireless communication device capable of performing a plurality of tasks including communicating information using a radio technology, or a combination of any two or more of these devices.

The client device 150 may include one or more gesture input sensors 152. The gesture input sensor 152 may be a touch sensing component (e.g., touch-sensitive screen, touch pad, touch switch, etc.), a motion or location sensing device, or a combination thereof. Further, the client device 150 may include an output module (not shown) that conveys information associated with the operation of the server 101, the test computer 160 or the client device 150 itself.

The client device 150 may further include a processor, a memory or non-transitory computer-readable media, an interface card, and so forth. The memory may store a graphical user interface and/or an Internet browser. In some implementations, the memory further stores a record/replay tool 154 for recording and/or replaying gesture events (e.g., touch event) generated upon receiving input from the gesture input sensor 152. For example, the record/replay tool 154 may record gesture events when a user uses one or more fingers, styluses, or any other pointing means, to tap, drag, hold and/or pinch a specified display window or virtual button. Other types of gesture events, such as mouse or keyboard gesture events, may also be recorded. The record/replay tool 154 may be written in any programming language, such as a C, C++, JAVA, JAVASCRIPT, VISUAL BASIC, assembler, PERL, any suitable version of 4GL, as well as others. Although not necessary, the record/replay tool 154 may be implemented using JQuery. JQuery refers to a JAVASCRIPT Library for HTML document traversing, event handling, animating and Ajax interactions. In addition, the record/replay tool 154 performs the functionality required to interact with the event processing module 122 implemented in the server 101, as will be described in more detail herein.

The test computer 160 may be any electronic computer device operable to receive, transmit, process, and store any appropriate data associated with the system 100 of FIG. 1. Although shown as a single machine, the test computer 160 may be embodied as multiple machines or reside on the same physical machine as the server 101. The test computer 160 serves to perform automated testing of the web application targeted for testing based at least in part on the recorded gesture events. The recorded gesture events may be replayed so as to invoke particular functions (e.g., calculation, highlighting, resizing of display, etc.) of the target web application, allowing the tester (or user) to verify if the expected results are obtained.

The test computer 160 may be, for example, a personal computer, a desktop, a laptop, a touch screen terminal, a workstation, a network computer, a server, etc. One or more processors within these or other devices, or any other suitable processing device, and typically includes many or all of the elements described above relative to server 101. The test computer 160 may also include one or more instances of non-transitory computer readable storage media or memory devices (not shown). The non-transitory computer readable storage media may include an automated testing module 162 suitable for interacting with the event processing module 122 over the network. The automated testing module 162 may be written in any programming language that enables the module 162 to interact with a web browser, such as a C, C++, JAVA, JAVASCRIPT, VISUAL BASIC, assembler, PERL, any suitable version of 4GL, as well as others. Examples of such interactions include automatically launching the web browser, organizing test cases, capturing test output (e.g., screen capture), verifying test results, generating reports, etc. In addition, the non-transitory computer readable storage media may further include a record/replay tool 154, similar to the one described with respect to client device 150, for replaying gesture events in test cases. More details of these and other exemplary features will be provided in the following sections.

Figure 2:
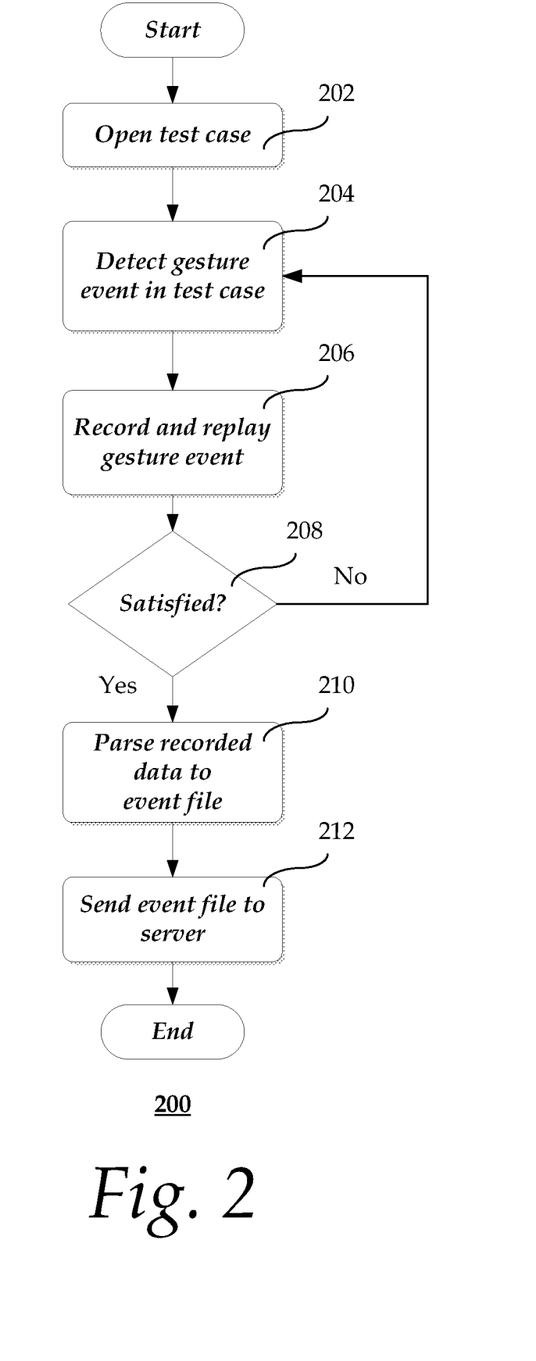
FIG. 2 shows an exemplary method of recording gesture-based events.

FIG. 2 shows an exemplary method 200 of recording gesture-based events. The method 200 may be implemented by the record/replay tool 154 stored in the client device 150, as previously described with reference to FIG. 1. It should be noted that in the following discussion, reference will be made, using like numerals, to the features described in FIG. 1.

At 202, a test case is opened to record gestures. Generally, a test case specifies a typical scenario of exercising a web application targeted for testing. For example, the test case may specify a specific sequence of steps to be performed by a user of the target web application, as well as some explicit or implicit specification of what constitutes correct, expected or valid behavior of the target web application under the scenario. Each test case may be designed to test specific web elements of the target web application. The target web application may be executed with the test case as input to check if the target web application yields the expected results.

In some implementations, opening a test case includes launching one or more test web pages using a web browser. The test web page may include one or more embedded links to the target web application, embedded links to other web pages, structural semantics for text and links, images, and/or other web elements (e.g., form fields, executable JAVASCRIPT code segments, etc.). In one implementation, the test web page includes an embedded link to a mock control module. Upon receipt of the test web page by a web browser, the web browser may execute embedded calls to the mock control module, which then interacts with the target web application in accordance with recorded gesture events.

The test web page may be launched by specifying a predefined identifier (e.g., uniform resource locator, uniform resource identifier, IP address, etc.) via the web browser, which then retrieves the test web page over the network 132. Alternatively, the test web page may be automatically launched via the web browser when the user specifies or selects the test case from a list of available test cases. The test web page may be stored in server 101 or other web server, or reside locally in the client device 150 (e.g., cache memory). The test web page may present a user interface that accepts gesture-based user input and sends the input to the target web application.

In some implementations, the test case is designed to capture interactions with one or more specific target web elements in the test web page. More particularly, the test web page may include one or more target web elements that the user can interact with using, for example, one or more fingers, hands or other gesture means (e.g. stylus). Exemplary target web elements include virtual buttons in a graphical user interface, predefined regions that support touch or multi-touch input (e.g., drag, pinch open, pinch close, etc.), hyperlinks, links, images, text boxes, pull-down menus, frames, and other web elements.

The record/replay tool 154 may be embedded as a code segment or file (e.g., JAVASCRIPT code) in the body of the test web page. The user may then activate the record/replay tool 154 to record gesture events by selecting a web element (e.g., virtual button or icon, hyperlink, link, image, text box, pull-down menu, frame, etc.) on the test web page.

At 204, one or more gesture events are detected in the test case. A gesture event is generated when a user interacts with one or more target web elements defined in the test case or test web page. The user interaction may be in the form of a gesture that is sensed by the gesture input sensor 152 that results in the generation of one or more gesture events. For example, a simple touch gesture may result in the generation of a sequence of gesture events, including a touchstart event, one or more touchmove events and a touchend or touchcancel event. See, for example, Touch Events version 1, W3C Candidate Recommendation 15 Dec. 2011, World Wide Consortium, Working Draft, which is herein incorporated by reference. A touchstart event is detected when a user first places a finger (or other pointing means) on a touch sensitive display (or gesture input sensor) 152 in a region on the test web page that is associated with an event listener (or event handler). When the user moves his finger around the test web page, one or more touchmove events may be detected. When the user lifts his finger off the test web page, a touchend event may be detected. A touchcancel event may be detected when regular event handling is interrupted by, for example, locking the touch sensitive display 152 to prevent inadvertent touches, It is understood that other touch or gesture events are also possible. In addition, two or more of the gesture events may occur at substantially the same time, such as in the case of a multi-touch gesture.

The record/replay tool 154 may register one or more event listeners to be notified of gesture events under each target web element. An event listener (or event handler) is generally a callback subroutine that handles or processes inputs (or events) received by a program. In some implementations, one event listener is registered for detecting each type of gesture event. The record/replay tool 154 may register, under a target web element, a first event listener to detect a touchstart event, a second event listener to detect a touchmove event, a third event listener to detect a touchend event and a fourth event listener to detect a touchcancel event. Alternatively, a single event listener may be registered for detecting multiple gesture events. Even further, more than one event listener may be registered for detecting a single kind of gesture event. The event listeners may be inserted into the HTML tags of the test web page, such as DIV, CANVAS or other elements that can trigger gesture events. Each event listener may execute a scripting language to, for example, call the record/replay tool 154 to perform a recording function each time it detects the respective gesture event.

Referring back to FIG. 2, at 206, the gesture event is recorded. The gesture event may be recorded by invoking the event listener associated with the target web element within which the gesture event is detected. In some implementations, each gesture event is recorded as a data object (e.g., JAVASCRIPT code object) or any other suitable data structure. The data object saves information about the gesture event, such as the type of event (e.g., touchstart, touchmove, touchend, touchcancel, etc.), event source (e.g., target web element), a unique identifier, the time and location of occurrence (e.g., coordinates of the touch-sensitive display), and so forth. The data objects may be stored in the memory of the client device 150 and retrieved for subsequent replay. A local log file listing the recorded gesture events may be maintained at the client device 150. Each local log file may correspond to a test case. The local log file may be saved in the memory as, for example, a temporary data object (e.g., JAVASCRIPT code object). The local log file may be retrieved from memory during replay to access the recorded gesture events.

More particularly, the recorded gesture events may be replayed on the client device 150 to allow the user to verify the recorded events immediately after recording so as to ensure that the gesture events are recorded as desired. The recorded gesture events may also be replayed at the test computer 160, as will be discussed later. The replay may include presenting a replay animation, which includes screenshots of the test web page at predetermined time points. The predetermined time points may include a start time point, an end time point, and one or more intermittent time points between the start time point and the end time point. The start time point may indicate a time point when the replay animation starts (e.g., prior to detecting any gesture events). The end time point may indicate a time point when the replay animation ends (e.g., after all gesture events are detected). The intermittent time points may be evenly allocated between the start time point and the end time point along the timeline of the replay animation. The replay may also include displaying a timeline showing the progression of the replay animation.

Other features may also be provided at the client device 150. For example, after the user performs certain gestures (e.g., pinch-in to zoom in), the view of the displayed test web page may have changed. A "Restore" feature may be provided to enable the user to restore the test web page to its original state. In addition, an application programming interface (API) may be provided to allow the user to modify or customize the underlying recorded data that represents the recorded gesture events. With this API, recorded data may be reused for a different test case simply by editing or revising some of the original recorded data.

At 208, if the user is not satisfied with the recorded gesture events, steps 204 and 206 are repeated. Once the user is satisfied, the process continues at 210. The recorded data is parsed into an event file. Each event file may correspond to one or more recorded gestures. In some implementations, the event file is formatted as a standard data interchange file. For example, the event file may be formatted as a JAVASCRIPT Object Notation (JSON) file, which is a lightweight data-interchange format that is widely used for serializing and transmitting structured data over a network connection. It should be appreciated that other types of formats, such as XML, CurlyML, PL, Record-Jar, Simple Declarative Language, and YAWL may also be used.

Figure 3A:
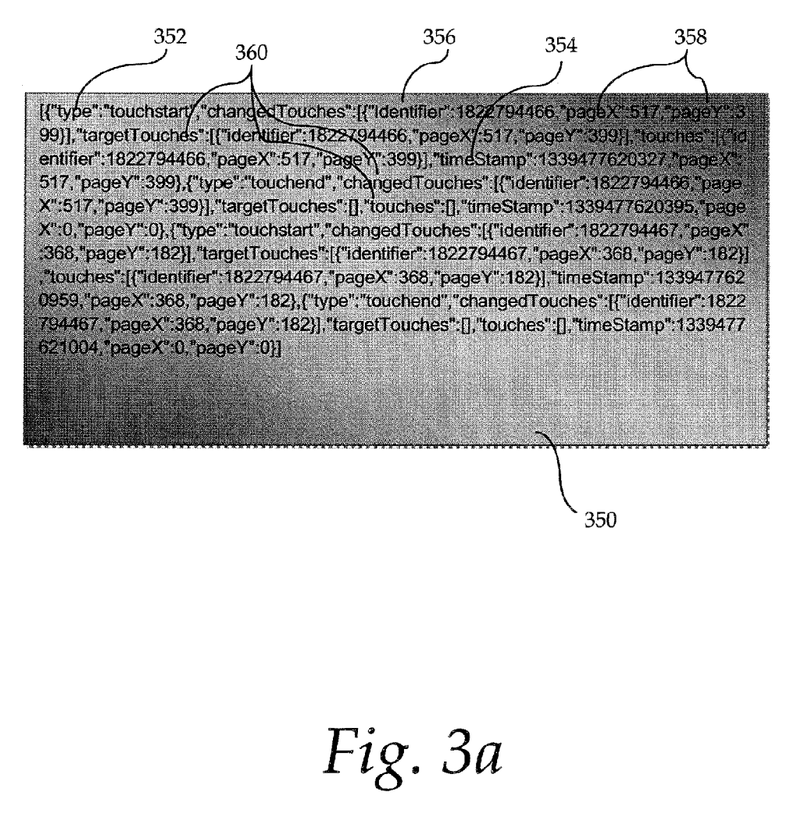
FIG. 3a shows an exemplary JSON event file.

FIG. 3a shows an exemplary JSON event file 350. The JSON event file 350 contains recorded data of a simple tap gesture. "Type" 352 represents the type of touch event (e.g., touchstart, touchmove, touchend, touchcancel, etc.). "Timestamp" 354 records the current time when the touch event occurred. "Identifier" 356 represents a unique identification number for each touch point. "PageX" and "pageY" 358 are the horizontal and vertical coordinates (in pixels) of the touch point relative to the viewport. "Touches," "targetTouch" and "changedTouches" 360 represent lists of touches for every touch point.

Referring back to FIG. 2, at 212, the record/replay tool 154 sends the event file to the server 101. In some implementations, the record/replay tool 154 uses Asynchronous JAVASCRIPT code and XML (Ajax) to send the event file to the server 101. Ajax is a group of interrelated web development techniques (e.g., dynamic HTML, JAVASCRIPT code and/or CSS) used on the client-side to create asynchronous web applications. With Ajax, the record/replay tool 154 may send exchange data with the server 101. asynchronously (in the background) without interfering with the display and behavior of the existing web page. It should be appreciated that other technologies may also be used. Once the server 101 receives the event file, it may store them in the form of, for example, text files.

Figure 3B:
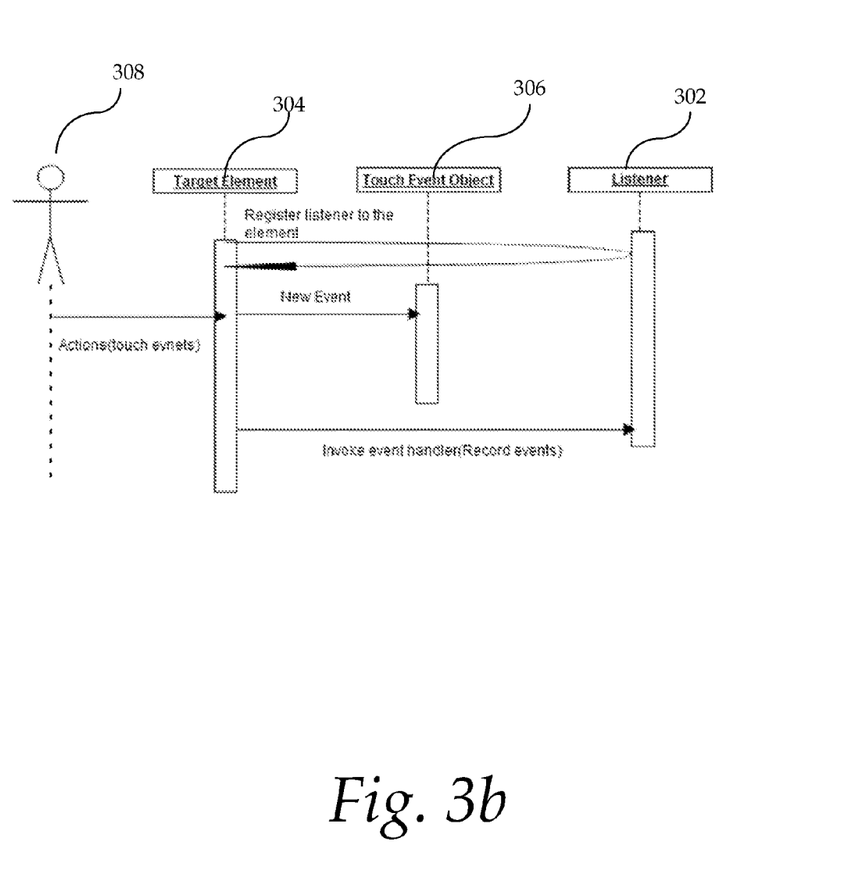
FIG. 3b shows an exemplary sequence diagram for recording touch events at the client device.

FIG. 3b shows an exemplary sequence diagram for recording touch events at the client device 150. First, the record/replay tool 154 registers an event listener 302 under a target web element 304 to be notified of a touch event. Subsequently, when the user 308 interacts with the target web element 304 specified in the test web page by, for example, touching the touch sensitive display of the client device 150, the target web element 304 generates a new touch event object 306. Upon detecting the new touch event, the listener 302 then handles the new touch event by, for example, recording it.

Figure 4:
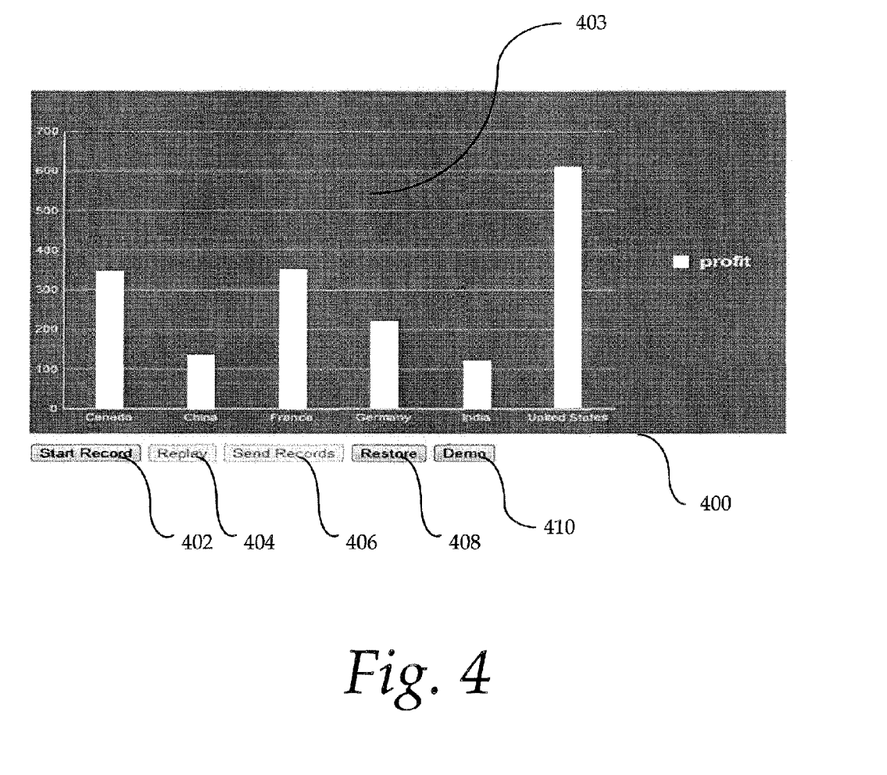
FIG. 4 shows an exemplary test web page.

FIG. 4 shows an exemplary test web page 400. The test web page 400 may be viewed using a web browser at the client device 150. To start recording gesture events, the user may select the "Start Record" button 402. Subsequently, all supported touch user interactions with the target web element (or HTML canvas) 403 will be recorded automatically. The user may, for example, resize (zoom in or out) the view of the target web element by performing a pinch open or close gesture using two fingers. To stop the recording, the user may select the "Stop Record" button 402. The user can then replay the recorded touch events by selecting the "Replay" button 404. When the user selects the "Send Records" button 406, the record/replay tool 154 will generate the event file and send it to the server 101. The "Restore" button 408 allows the user to choose to restore the web page to its original state. The "Demo" button 410, when selected, presents an animation to demonstrate the type of gestures that are supported under the target web element 403.

Figure 5:
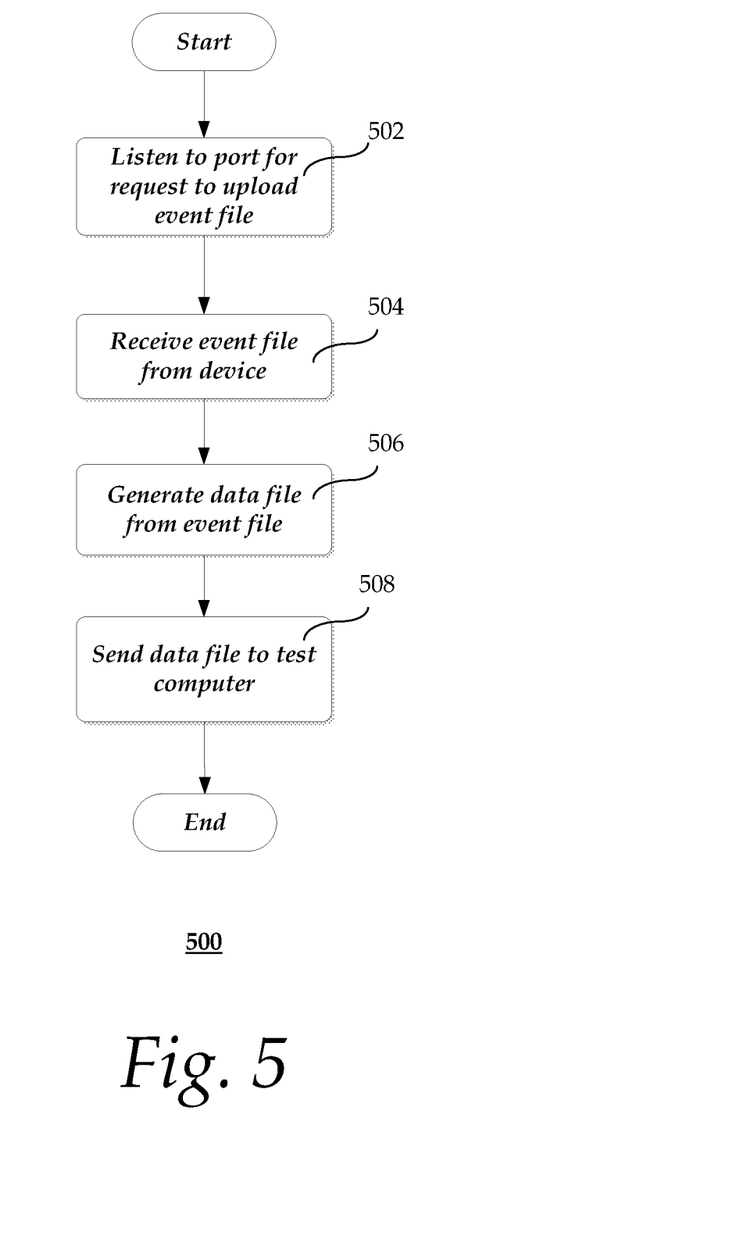
FIG. 5 shows an exemplary method of processing an event file.

FIG. 5 shows an exemplary method 500 of processing the event file. In some implementations, the method 500 is executed by the event processing module 122 implemented on server 101. It should be noted that in the following discussion, reference will be made, using like numerals, to the features described in FIG. 1.

At 502, the event processing module 122 listens on a predefined port (e.g., HTTPS port 443) for a request to upload data. In some implementations, the client device 150 issues a standard HTTP POST request to the server 101 to initiate the upload of the event file.

At 504, the event processing module 122 receives the event file from the client device 150, which sends it as part of the POST transmission. Other data, such as other event files or test case information (e.g., names), may also be received from the client device 150. This transaction terminates normally after the transmission is completed. As discussed previously, the event file may include a JSON file that describes one or more gesture events recorded in a respective test case.

At 506, the event processing module 122 generates a data file based on the event file. Each data file may correspond to one or more test cases. The data file may be a text (or ASCII) file, a binary file or a file of any other suitable file format compatible with the test computer 160. The data file may include information about the event file and its recorded gesture events, such as the test case name, description, author, recorded data of gesture events, etc. In addition, the event processing module 122 may further maintain a server log file that keeps track of all the data files generated and the corresponding test case names.

At 508, the event processing module 122 sends the data file to the test computer 160 for performing automated testing. Other files or data, such as the server log file, may also be sent to the test computer 160. The files may be sent in response to a HTTP GET request from the test computer 160.

Figure 6:
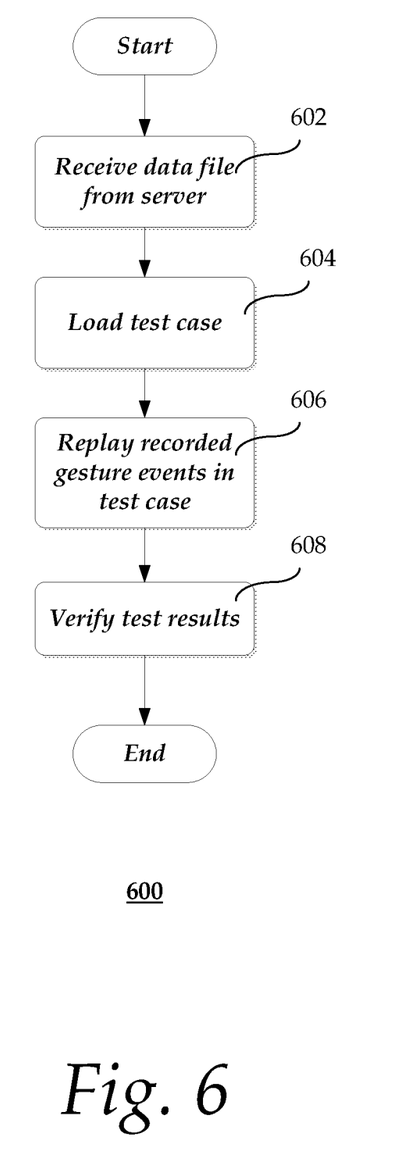
FIG. 6 shows a method of automated testing.

FIG. 6 shows a method 600 of automated testing. In some implementations, the method 600 is performed at the test computer 160. As discussed previously, the test computer 160 may be implemented as one or more separate machines, or the same physical machine as the server 101.

At 602, the automated testing module 162 receives the data file from the server 101. Other files or data, such as the server log file, may also be received. As discussed previously, the data file contains information of recorded gesture events, as well as other types of information. The server log file stores information of all the data files and the corresponding test case names.

At 604, a test case is loaded with information retrieved from the data file. Information about which data file corresponds to the given test case name may be found in the server log file. As discussed previously, the test case may be presented in the form of one or more test web pages coded in a markup language, and loaded via a web browser. A tester may select and launch the test case by specifying a predefined identifier (e.g., URL, URI, IP address, etc.) via the web browser, which then retrieves the test web page. The test web page may be stored in server 101 or other web server, or reside locally in the test computer 160 (e.g., cache memory). Alternatively, the test web page may be automatically launched via the web browser when the tester or user specifies or selects a test case name from a list of available test cases. The list of available test case names may be retrieved from, for example, the server log file.

Once the test case is loaded, the automated testing module 162 may create one or more native gesture events (e.g., native html event objects). The one or more native gesture events are initialized with real recorded data retrieved from the data file. For example, a native gesture event may be initialized with the timestamp, type, location, etc. of a corresponding recorded gesture event. The timestamps may be used to calculate the time interval between one native gesture event and the subsequent native gesture event, thus allowing the automated testing module 162 to sort and trigger the native gesture events in the recorded time sequence during replay. It should be understood that multiple native gesture events may be simultaneously triggered at one time point, such as in the case of multi-touch gestures.

At 606, the record/replay tool 154 replays the recorded gesture events. The record/replay tool 154 may be embedded as a code segment or file (e.g., JAVASCRIPT code) in the body of the test web page. The record/replay tool 154 may be automatically activated upon loading the test web page to replay the gesture events. During replay, the one or more native gesture events are attached to at least one target web element in the test web page to simulate a real user gesture-based interaction. The target web element triggers or invokes a native event listener (or event handler) associated with the target web element to execute the target web application and generate test results. The native event listener may be, for example, one or more functions of the target web application. Multiple native gesture events may be triggered in accordance with the recorded time sequence.

A set of screenshots of the test web page may be taken at predetermined time points along a timeline. The predetermined time points may include a start time point, an end time point, and one or more intermittent time points between the start time point and the end time point. The start time point may indicate a time point when the replay animation starts (e.g., prior to triggering of any native gesture event). The end time point may indicate a time point when the replay animation ends (e.g., after all native gesture events are triggered). The intermittent time points may be evenly allocated between the start time point and the end time point along the timeline of the replay animation. The screenshots may then be compiled and presented as a replay animation. The timeline may also be displayed to show the progression of the replay animation. Other types of visual representations are also useful.

Figure 7:
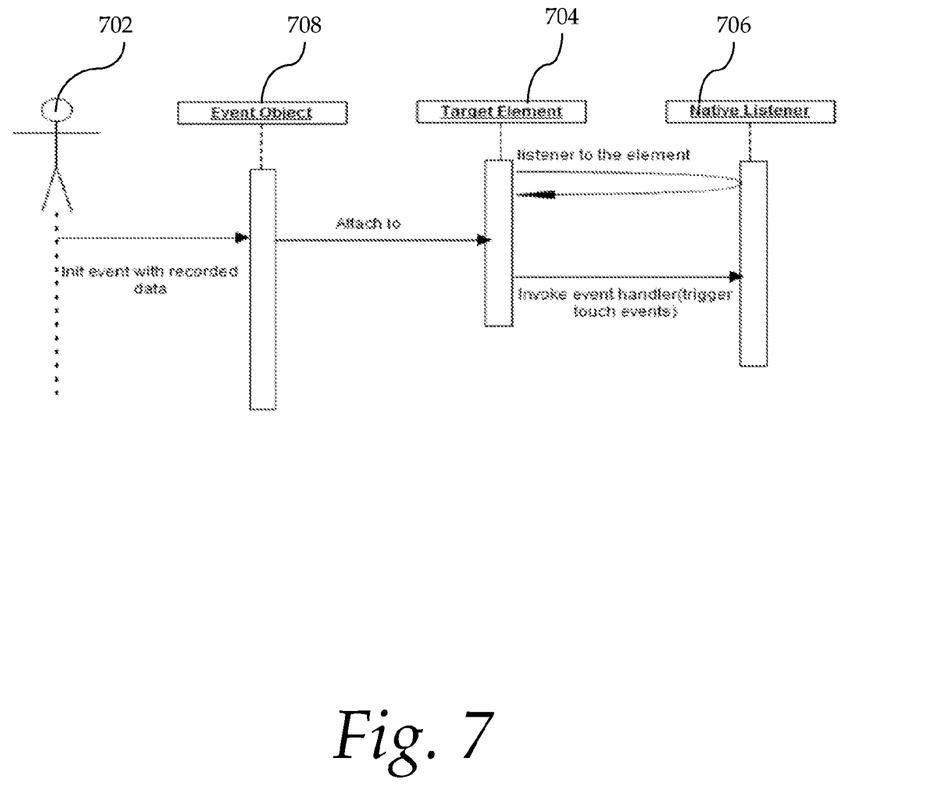
FIG. 7 shows an exemplary sequence diagram for replaying recorded touch events at the test computer.

FIG. 7 shows an exemplary sequence diagram for replaying recorded touch events at the test computer 160. The record/replay tool 154 registers a native listener 706 under a target web element 704 of the test web page to be notified of touch (or gesture) events. After the user 702 activates the record/replay tool 154, the record/replay tool 154 creates and initializes a new native event object 708 with the real recorded data retrieved from the data file. The native event object 708 represents a simulated gesture-based user interaction. The record/replay tool 154 then triggers (e.g., using JQuery) the native event object 708 and attaches it to the target web element 704 in the test web page. Upon detecting the native event object 708, the native listener 706 invokes the associated event handler to execute one or more functions of the target web application to generate test results.

Referring back to FIG. 6, at 608, the test results are automatically verified by the automated testing module 162. Verification is the process whereby the test results are compared to a benchmark to determine if the target web application is operating correctly or conforming to its specification. The aim of such software verification is to determine if the results of handling a simulated gesture event are correct or in accordance with expected behavior. For example, if a user touches a bar in a bar chart, the bar is expected to be highlighted. Accordingly, when such a touch event associated with the bar chart is automatically simulated during replay, the output of the touch event handling is verified by determining if the bar is highlighted. If not, the target web application has a bug that needs to be fixed. The results of the verification may be described in a report (e.g., XML document) automatically generated by the automated testing module 162.

In some implementations, the automated testing module 162 performs the verification by comparing screenshots of the test web page in the replay animation. As discussed previously, the replay animation may include screenshots of the test web page at predetermined times. In some implementations, the first screenshot (i.e. benchmark) and last screenshot (i.e. test results) of the replay animation are compared.

Alternatively, the states of the test web page before and after the replay or handling of the simulated gesture event by the target web application may be compared to verify the test results. The state of the test web page may be serialized into a string by, for example, concatenating or joining HTML. Canvas API commands into a string. HTML Canvas refers to a drawable region defined in HTML code which can be used to draw graphics using scripting (e.g., JAVASCRIPT code)

commands. HTML Canvas API commands may be invoked in response to handling of the simulated gesture events. It should be understood that other methods of storing the states of the test web page may also be applied. By comparing the page states before and after the handling of the simulated gesture event, errors introduced by the event handling may be detected.

Figure 8:
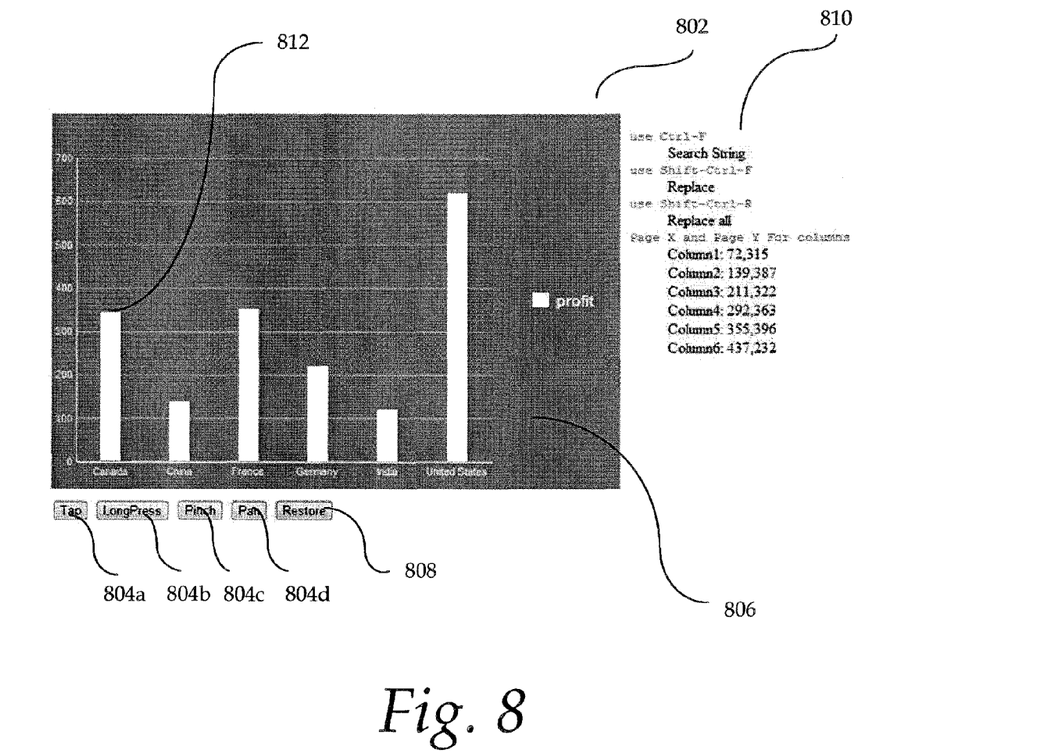
FIG. 8 shows another exemplary test web page.

FIG. 8 shows an exemplary test web page 802. The test web page 802 may be viewed using a web browser at the test computer 160. To replay recorded gesture events, the user may select at least one of the virtual buttons 804a-d. Each virtual button 804a-d may be labeled with the type of gesture that can be replayed. The user may, for example, initiate the replay of a recorded tap gesture, a long press gesture, a pinch gesture or a pan gesture by selecting the respective button 804a-d. The selected recorded gesture may then be replayed within the target web element or canvas 806. During the replay, an animation illustrating the sequence of recorded gesture events may be presented.

The recorded gesture events may invoke one or more functions of the target web application to generate test results. The test results may then be verified by comparing the first and last screenshots in the replay animation. The "Restore" button 808 allows the user to choose to restore the web page 802 to its original state. The software code 810 for simulating the recorded gesture events may be displayed for editing. The tester may modify the code by, for example, changing the timestamp, setting new touch positions (e.g., location of each graph column 812), and so forth. Hence, by recording the gesture events only once at the client device 150, the recorded data or code for simulating the gesture events may be reused for automated testing at the test computer 160 many times and in different test cases.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of testing a web application, comprising:
   receiving, by a computer, a data file including recorded data of one or more gesture events performed by a user and recorded and replayed using one or more web elements on a test web page;
   loading, by the computer, a test case with the recorded data;
   replaying, by the computer, the one or more recorded gesture events in the test case and executing the web application to generate test results; and
   automatically verifying the test results by serializing states of the test case into strings and comparing the strings, wherein serializing the states of the test case comprises concatenating Hypertext Markup Language (HTML) Canvas application programming interface (API) commands into the strings.

2. The method of claim 1 wherein the one or more recorded gesture events comprise one or more recorded touch or multi-touch events.

3. The method of claim 1 wherein the recorded data comprises a timestamp, type, location, or a combination thereof, of the one or more recorded gesture events.

4. The method of claim 1 wherein loading the test case includes launching a test web page via a web browser.

5. The method of claim 4 wherein loading the test case includes initializing one or more native gesture events with the recorded data.

6. The method of claim 5 wherein replaying the one or more recorded gesture events comprises:
   attaching the one or more native gesture events to at least one target web element in the test web page; and
   triggering a native event listener associated with the target web element to execute the web application and generate the test results.

7. The method of claim 1 wherein replaying the one or more recorded gesture events comprises presenting a replay animation.

8. The method of claim 1 wherein at least one of the one or more web elements is labeled with a particular type of recorded gesture event to be replayed.

9. The method of claim 1 wherein automatically verifying the test results further comprises comparing screenshots in a replay animation.

10. The method of claim 1 wherein the states of the test case are obtained prior to and after the replaying.

11. The method of claim 1 further comprising restoring the test case to its original state.

12. The method of claim 1 wherein receiving the data file comprises receiving the data file from a server in response to a request from the computer.

13. The method of claim 1 further comprising recording, at a client device, data of the one or more gesture events.

14. The method of claim 13 further comprising parsing, at the client device, the recorded data into an event file.

15. The method of claim 14 further comprising sending, by the client device, the event file to a server, wherein the server, the client device and the computer are communicatively coupled through a network.

16. The method of claim 13 wherein recording the data comprises:
   registering an event listener under a target web element in a test web page; and
   invoking the event listener to record the data in response to detecting a new gesture event within the target web element.

17. A non-transitory computer-readable medium having stored thereon program code, the program code executable by a computer to:
   receive a data file including recorded data of one or more gesture events performed by a user and recorded and replayed using one or more web elements on a test web page;
   load a test case with the recorded data;
   replay the one or more recorded gesture events in the test case and execute a web application to generate test results; and
   automatically verify the test results by serializing states of the test case into strings and comparing the strings, wherein serializing the states of the test case comprises concatenating Hypertext Markup Language (HTML) Canvas application programming interface (API) commands into the strings.

18. A system comprising:
   a non-transitory memory device for storing computer-readable program code; and
   a processor in communication with the memory device, the processor being operative with the computer-readable program code to:
   receive a data file including recorded data of one or more gesture events performed by a user and recorded and replayed using one or more web elements on a test web page,
   load a test case with the recorded data, replay the one or more recorded gesture events in the test case and execute a web application to generate test results, and automatically verify the test results by serializing states of the test case into strings and comparing the strings, wherein serializing the states of the test case comprises concatenating Hypertext Markup Language (HTML) Canvas application programming interface (API) commands into the strings.

\* \* \* \* \*